United States Patent [19]
Bean

[11] 3,995,015
[45] Nov. 30, 1976

[54] PROCESS FOR MAKING SODIUM METABISULFITE

[75] Inventor: Samuel L. Bean, Jamesville, N.Y.

[73] Assignee: Allied Chemical Corporation, Morris Township, N.J.

[22] Filed: Mar. 27, 1975

[21] Appl. No.: 562,626

[52] U.S. Cl. ............................................. 423/519
[51] Int. Cl.² ......................................... C01D 5/14
[58] Field of Search ............................ 423/513, 519

[56] References Cited
UNITED STATES PATENTS

| | | | |
|---|---|---|---|
| 1,638,492 | 8/1927 | Laury.................................. | 423/513 |
| 2,245,697 | 6/1941 | Melendy............................. | 423/519 |
| 3,361,524 | 1/1968 | Spormann et al................ | 423/519 X |
| 3,369,866 | 2/1968 | Spormann et al................... | 423/519 |
| 3,860,695 | 1/1975 | Metzger et al...................... | 423/519 |

*Primary Examiner*—Earl C. Thomas
*Attorney, Agent, or Firm*—Gerhard H. Fuchs; Gerard P. Rooney

[57] ABSTRACT

Improvement in the process for making sodium metabisulfite by contacting a suspension of sodium carbonate in countercurrent stream with sulfur dioxide, which involves passing sulfur dioxide-containing gas sequentially through a first and a second reaction vessel, maintaining an acidic aqueous slurry of sodium metabisulfite in the first reaction vessel and a strongly alkaline aqueous slurry of sodium carbonate in the second reaction vessel, continuously feeding sodium carbonate to the second reaction vessel, passing strongly alkaline slurry from the second reaction vessel to the first reaction vessel and overflowing excess liquid from the first reaction vessel to the second reaction vessel, and recovering sodium metabisulfite crystals from the slurry in the first reaction vessel.

7 Claims, 1 Drawing Figure

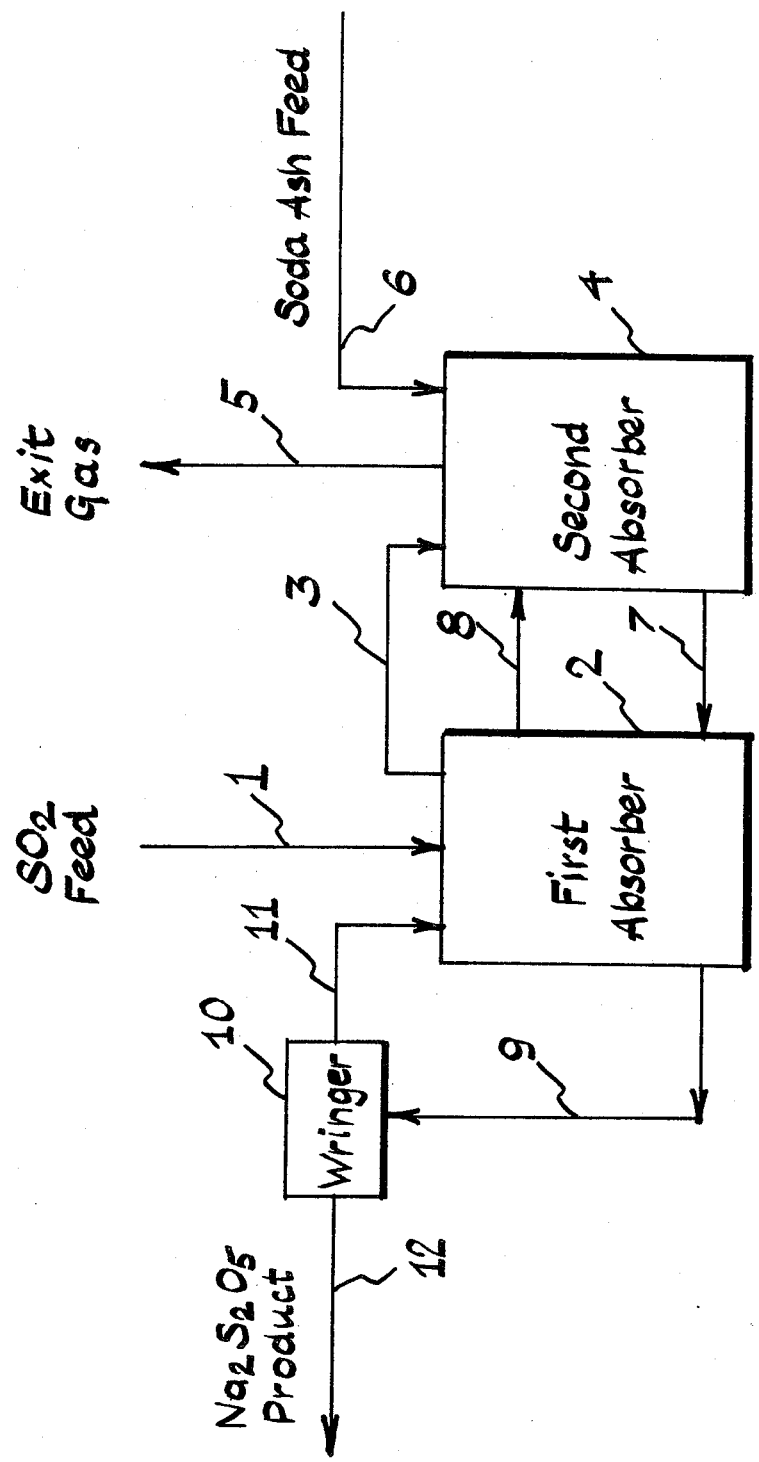

PROCESS FOR MAKING SODIUM METABISULFITE

BACKGROUND OF THE INVENTION

Reaction of sodium carbonate with sulfur dioxide to form sodium metabisulfite ($Na_2S_2O_5$) proceeds in accordance with the following equations:

(1) $Na_2CO_3 + SO_2 \rightarrow Na_2SO_3 + CO_2$
(2) $Na_2SO_3 + SO_2 \rightarrow Na_2S_2O_5$ These reactions are well known, yet their commercial application has posed many difficulties. In one known process sodium carbonate is suspended in a concentrated solution of sodium sulfite and the suspension is passed serially through cascading absorber vessels countercurrent to a sulfur dioxide-containing gas stream. The suspension in the vessel into which the sodium carbonate is introduced, and through which the gas stream passes last, is maintained on the alkaline side to minimize sulfur dioxide emission in the exit gases. There is obtained in the absorption vessel through which the sulfur dioxide-containing gas stream passes first an acidic suspension of sodium metabisulfite crystals. The pH of the liquid in the intermediate vessels ranges from alkaline through neutral to strongly acidic. This process has two outstanding disadvantages.

First, the intermediate vessels of necessity contain very heavy slurries of sodium sulfite. Under the process conditions, approximate solubilities of sodium metabisulfite, sodium sulfite and sodium carbonate are about 40 percent, 23 percent and 30 percent, respectively. In order to obtain acceptable space-time yields, sodium metabisulfite concentration in the vessel through which the sulfur-dioxiding containing gas stream passes first must be maintained well above 40 percent, on the basis of the slurry. Hence, it is readily apparent that the intermediate vessels will be heavily loaded with relatively less soluble sodium sulfite crystals. In this type of process, the intermediate vessels and connecting pipes, especially the valves in the connecting pipes, tend to become choked by enrusted crystalline sodium sulfite. Further, these sodium sulfite crystals are abrasive, causing rapid wear of valves and pumps.

Second, sodium sulfite oxidizes with comparative ease to form sodium sulfate, especially under slightly alkaline or neutral conditions. As is readily apparent, the intermediate vessels containing large amounts of suspended sodium sulfite must pass through weakly alkaline and neutral stages, so that undesirable sodium sulfate is formed which gradually builds up in the process liquors and can be removed therefrom only by purging the liquors. In order to meet sulfate specifications for the metabisulfite product, sulfate contamination may not exceed certain maximum limits, which can be maintained only by purging liquors from the process, resulting in product losses, unless other uses can be found for the purge liquor.

To overcome difficulties caused by sulfate formation, Melendy in U.S. Pat. No. 2,245,697 proposed to conduct the reaction of sodium carbonate and sulfur dioxide to form sodium metabisulfite in a series of two absorption vessels wherein the process liquors in each of these absorption vessels is maintained under acidic conditions. To that end, Melendy slurries sodium carbonate in sodium metabisulfite process mother liquor in a separate mix tank to obtain a strongly alkaline emulsion, which emulsion be then feeds into the second of the two absorption vessels. In that second absorption vessel the sodium carbonate react with sulfur dioxide to form sodium sulfite crystals. The slurry in the second absorption vessel is maintained under slightly acidic conditions. Slurry from the second absorption vessel is passed to the first absorption vessel wherein the sodium sulfite is reacted with sulfur dioxide to form sodium metabisulfite. The slurry in the first vessel is maintained under strongly acidic conditions. Sulfur dioxide is introduced directly into both the first and the second absorption vessel. Off-gases from the first absorption vessel are passed to the second absorption vessel, and off-gases from the second absorption vessel are exhausted to the atmosphere. The Melendy process substantially reduces formation of sodium sulfate by-product because it avoids need for maintaining sodium sulfite under slightly alkaline or neutral conditions. The Melendy process, however, does not avoid need for handling highly concentrated slurries of sodium sulfite, with concomitant difficulties of equipment wear and crystal encrustation.

Difficulties arising from need for handling heavy sodium sulfite slurries is avoided by the process disclosed in U.S. Pat. No. 3,860,695 to Metzger et al. In that process formation of crystalline sodium metabisulfite is effect by feeding sulfur dioxide-containing gases into weakly acidic sodium metabisulfite mother liquor in a jet scrubber submerged in the mother liquor. Sodium metabisulfite product crystals are separated from the mother liquor, the mother liquor is pump-circulated, and sodium hydroxide or sodium carbonate solution are added to maintain the pH of the mother liquor at from 4 to 5. This process, unfortunately, has the disadvantage that the residual off-gas leaving the reaction vessel contains substantial amounts of unreacted sulfur dioxide, so that it cannot be exhausted directly to the atmosphere. Hence, the patentees recommend that it be used to make sodium hydrogen sulfite or sodium sulfite in a separate apparatus or plant. Since this is not always economically feasible, the Metzger et al. process has severe limitations.

It is an object of the present invention to provide an improvement in the process for making sodium metabisulfite avoiding disadvantages of prior art processes.

SUMMARY OF THE PRESENT INVENTION

The present invention provides an improved process for continuous manufacture of crystalline sodium metabisulfite from sulfur dioxide and sodium carbonate by passing sulfur dioxide-containing gases serially through two reaction vessels wherein in the first reaction vessel the reaction mixture is maintained under strongly acidic conditions, and in the second reaction vessel the reaction mixture is maintained under strongly alkaline conditions.

In accordance with the present invention, there is provided an improvement in the process for making sodium metabisulfite from sulfur dioxide and sodium carbonate by introducing sulfur dioxide and sodium carbonate into aqueous reaction media to form sodium metabisulfite crystals therein and recovering the sodium metabisulfite crystals, which improvement comprises a. establishing a first aqueous reaction medium and a second aqueous reaction medium, said first aqueous reaction medium comprising a suspension of sodium metabisulfite crystals in an acidic aqueous solution substantially saturated in sodium metabisulfite having acidity within the range at which a representative 10 ml. sample of the clear solution requires from about 1 to about 6 ml. N/l $H_2SO_4$ to bring such 10 ml. sample to neutral to methyl orange, and said second aqueous reaction medium comprising an alkaline aqueous suspension of sodium carbonate in a solution containing both sodium sulfite and sodium carbonate having alkalinity not less than that at which a representative 10 ml. sample of the suspension requires not less than about 90 ml. N/l $H_2SO_4$ to bring such 10 ml. sample to a neutral to methyl orange;

b. continuously introducing a sulfur dioxide-containing gas stream into said first aqueous reaction medium to effect absorption of sulfur dioxide in said first aqueous reaction medium and precipitation of sodium metabisulfite crystals therefrom, and introducing the sulfur-dioxide containing gas which remains unabsorbed in said first aqueous reaction medium into said second aqueous reaction medium to effect absorption of substantially all of the remaining sulfur dioxide therein and reaction with sodium carbonate to form sodium sulfite;

c. continuously introducing sodium carbonate into said second aqueous reaction medium at a rate sufficient to maintain its alkalinity within the above-stated range;

d. continuously transferring alkaline aqueous dispersion of sodium carbonate in a solution containing both sodium sulfite and sodium carbonate from said second aqueous reaction medium to said first aqueous reaction medium at a rate sufficient to maintain the acidity of said first aqueous reaction medium within the above-stated range, and overflowing substantially clear solution saturated in sodium metabisulfite from said first aqueous reaction medium to said second aqueous reaction medium to maintain substantially constant liquid level in said first aqueous reaction medium; and e. withdrawing solution of sodium metabisulfite containing suspended sodium metabisulfite crystals from said first aqueous reaction medium, separating sodium metabisulfite crystals therefrom, and returning the solution freed from crystals to said first aqueous reaction medium.

BRIEF DESCRIPTION OF THE DRAWING

The drawing shows a schematic flow diagram of the improved process of the present invention.

DETAILED DESCRIPTION OF THE INVENTION AND OF THE BEST MODE CONTEMPLATED FOR ITS PRACTICE.

With reference to the drawing, equipment employed includes a first absorber 2, a second absorber 4 and, desirably, a wringer 10.

First absorber 2 is a closed reaction vessel containing an aqueous reaction medium comprising a slurry of sodium metabisulfite crystals in an acidic aqueous solution substantially saturated in sodium metabisulfite, having acidity within the range at which a representative 10 ml. sample of the clear solution requires from about 1 to about 6 ml. of N/l $H_2SO_4$ to bring such 10 ml. sample to neutral to methyl orange.

Second absorber 4 is a closed reaction vessel containing an aqueous reaction medium comprising an alkaline aqueous dispersion of sodium carbonate in solution containing both sodium sulfite and sodium carbonate, having alkalinity not less than that at which a representative 10 ml. sample of the dispersion requires not less than about 90 ml. of N/l $H_2SO_4$ to bring such 10 ml. sample of the dispersion (not merely of the clear liquor) to neutral to methyl orange.

Sulfur dioxide-containing gas is introduced into first absorber 2 through sulfur dioxide feed-line 1 which terminates within the liquid reaction medium, desirably through sparger tubes or other means for effecting intimate gas/liquid contact. Sulfur dioxide-containing gas may be obtained from any source, but preferably is obtained by combustion of sulfur in air, as in a sulfur burner, and may contain from about 6 to 20 percent sulfur dioxide by volume. Gases remaining unabsorbed in first absorber 2 are transferred to second absorber 4 via sulfur dioxide transfer line 3, which terminates within the liquid reaction medium in second absorber 4, desirably through sparger tubes or other means for effecting intimate gas/liquid contact.

Tail gas from second absorber 4 substantially free of sulfur dioxide (containing less than 200 ppm by volume of sulfur dioxide, usually less than about 20 ppm by volume of sulfur dioxide) is exhausted to the atmosphere via tail gas stack 5.

Both first absorber 2 and second absorber 4 are equipped with effective means for agitation in order to maintain the crystal phases in suspension throughout the operation.

Sodium carbonate raw material, desirably in the form of anhydrous soda ash, preferably in the form of dense soda ash, is introduced into second absorber 4 by means of sodium carbonate feed 6. Sodium carbonate feed 6 desirably comprises means for continuously introducing the sodium carbonate at predetermined rate, such as for example a screw conveyor, belt feeder or other suitable device. Desirably, slight vacuum is maintained at tail gas stack 5 sufficient to prevent excessive sodium carbonate dusting at sodium carbonate feed 6, yet not so strong as to carry appreciable amounts of sodium carbonate dust out the tail gas stack.

Sulfur dioxide is introduced into the process at first absorber 2 via sulfur dioxide feed line 1 at rate sufficient to complete reaction with the sodium carbonate introduced into second absorber 4 to form sodium metabisulfite, that is to say, at the rate of two mols of sulfur dioxide per mol of sodium carbonate fed to the process, at least.

Alkaline aqueous reaction medium is continuously transferred from second absorber 4 through liquor transfer line 7 (by means of pump, not shown) into first absorber 2. In order to maintain constant liquid level within first absorber 2, liquor from first absorber 2, substantially free of crystals, is permitted to continually overflow through liquor overflow line 8 to second absorber 4. To prevent excessive carryover of sodium metabisulfite crystals from the first absorber to the second absorber, liquor overflow line 8 desirably begins at a stilling well (not shown) wherein acidic reaction medium is maintained at conditions sufficiently quiescent to permit settlement of crystals therefrom, which crystals are permitted to be retained in first absorber 2. Other means for preventing substantial transfer of sodium metabisulfite crystals from first absorber 2 to second absorber 4 via liquor overflow line 8 may include strainers, sieves, and the like. Reaction medium containing sodium metabisulfite crystals is continuously withdrawn from first absorber 2 through wringer feed line 9, equipped with pump (not shown) and is introduced into wringer 10, wherein crystals and liquid are separated. The liquid is returned to first absorber 2 via wringer effluent line 11, and crystal product is discharged via product draw-off 12 to a suitable dryer and, optionally, crystal classifier (neither shown).

In operation, acidity of the reaction medium in first absorber 2 is maintained within the range at which a representative 10 ml. sample of the clear solution requires from about 1 to about 6 ml., preferably from about 2 to about 4 ml., most preferably from about 2 to about 3 ml. of N/1 $H_2SO_4$ to bring the 10 ml. sample to neutral to methyl orange. It should be emphasized that titration with N/1 sulfuric acid to the methyl orange end point to determine acidity is conducted on a clear sample of the solution. A clear sample is simply obtained by withdrawing a sample of the reaction medium from first absorber 2, permitting it to stand for time sufficient for the crystals to settle, and withdrawing the sample required for titration from the clear supernatant liquid. Acidity in first absorber 2 is critical. If acidity is higher than about 1 ml. N/1 $H_2SO_4$ by the above described procedure, (so that titration would be less than about 1 ml. N/1 $H_2SO_4$) then too large a proportion of the sulfur dioxide introduced into first absorber 2 remains unabsorbed therein and is transferred over into second absorber 4. This is undesirable because it leads to excessive formation of sodium sulfite in second absorber 4, with concomitant problems arising from carrying high levels of crystalline sodium sulfite in suspension such as plugging of lines, crystal encrustation of equipment and wear of moving parts and valves. Further, under these conditions excessive foaming of the reaction medium in secondary absorber 4 will often be experienced which is difficult to control. If, on the other hand, acidic reaction medium in first absorber 2 is permitted to become less acidic than corresponding to a 6 ml. N/1 $H_2SO_4$ titration by the above test, (so that titration would require more than 6 ml. N/1 $H_2SO_4$) then the sodium sulfite content in the acidic reaction medium increases, with concomitant increase in sodium sulfite contamination of the sodium metabisulfite product, principally due to adherence of mother liquor to crystal surfaces. At any given rate of liquor interchange between first absorber 2 and second absorber 4, which rate of interchange for reasons of ease of process control is desirably maintained constant, acidity in the reaction medium in first absorber 2 can be increased by either increasing the flow of sulfur dioxidecontaining gas, or by temporarily decreasing the rate of sodium carbonate feed to the second absorber. If, however, titration of the clear liquor from the reaction medium of first absorber 2 is maintained within 2 to 6 ml. by the above test, then problems of sulfate contamination of the product, and excessive sodium sulfite formation in second absorber 4 with concomitant foaming are avoided. If the acidity of the reaction medium in first absorber 2 is maintained within the above-stated limits, then at least about 90 percent of the $SO_2$ introduced into it is absorbed therein, with only a minor part of the overall reaction being carried out in secondary absorber 4. By carrying out the reaction in this manner, only a minor portion of the sodium carbonate actually goes through the sodium sulfite stage, namely that part which reacts in the second absorber with the sodium metabisulfite contained in the overflow liquor from the first absorber to form sodium sulfite. The sodium carbonate carried into the first absorber seems to react to form sodium metabisulfite directly, seemingly by-passing the intermediate sodium sulfite stage. In any event, if sodium sulfite is formed in the first absorber, it promptly reacts with further sulfur dioxide to form the metabisulfite, so that the reaction medium in the first absorber is free of sodium sulfite, for practical purposes, if proper acidity levels are observed, as above described.

Temperature of the reaction medium in first absorber 2 is maintained within the range of about 80° to 160° F., desirably between about 110° to 140° F., most preferably about 120° to 130° F. At temperatures below about 110° F. there is danger of crystal build-up on the vessel walls which, surprisingly, does not seem to occur above about 110° F. At temperatures above about 140° F. the vapor pressure of sulfur dioxide in the reaction medium increases to levels at which undesirably high carry-over of unabsorbed sulfur dioxide into second absorber 4 will take place, with concomitant undesirably high formation of sodium sulfite and, perhaps, foaming in second absorber 4. First absorber 2 should be equipped with means for agitation, suitably with a paddle or turbine type agitator, in order to maintain the sodium metabisulfite crystals in suspension. Sodium metabisulfite crystals in the reaction medium in first absorber 2 may amount to about 15 to 70%, preferably about 25 to 40% by volume, determined by permitting a sample of the suspension in a graduate cylinder to settle into a crystal phase and a liquid phase and determining the relative height of liquid and crystal phases.

Alkalinity within the reaction medium in second absorber 4 is maintained at a level not less than that at which a representative 10 ml. sample of the dispersion requires not less than about 90 to 160 ml., preferably from about 100 to about 140 ml., and most preferably from about 110 to about 130 ml. of N/1 $H_2SO_4$ to bring such 10 ml. sample of the dispersion to neutral to methyl orange. Titration here is on the dispersion, not on the clear liquor. At any given feed rate of sulfur dioxide-containing gas, alkalinity of the reaction medium in second absorber 4 may conveniently be controlled by adjusting the sodium carbonate feed rate. In order to be able to operate at such relatively high alkalinity in the second absorber, the temperature of the reaction medium therein must be at least about 125° F., or else the sodium carbonate dispersed therein will form hydrate crystals which are more voluminous than the anhydrous soda ash, and the slurry in the second absorber may set up or at least may become too heavy or thick for handling. On the other hand, if the temperature of the reaction medium in the second absorber is permitted to rise much above about 180° F., then some of the sulfur dioxide may remain unabsorbed and my be exhausted in the tail gases, which is highly undesirable from an environmental point of view. In order to maintain sulfur dioxide content in the tail gases below about 200 ppm by volume, temperature of the reaction medium in the second absorber is desirably maintained below about 180° F., preferably at a temperature between about 125° to about 140° F. Second absorber 4 should also be equipped with efficient means for agitating the reaction medium so as to maintain the crystal slurry in uniform suspension. This may be conveniently accomplished by use of paddle or turbine type agitators, or the like.

The process requires little make-up water, only so much as may be required to compensate for the water lost with the product crystals and that lost through evaporation in the tail gases. Sufficient amount of water will usually be introduced through washing of crystal in the wringer, and through washdowns of equipment, for example at the point of sodium carbonate introduction or at the tail gas stack. Make-up water may be introduced at any point within the system.

The improved process of this invention has several advantages over prior art processes. First of all, it is simple in that it requires only two reaction vessels, although further vessels may be used, if desired. Second, the process is easily controlled. Once in equilibrium, minor adjustments in circulating rates, sulfur dioxide and sodium carbonate feed rates and/or rates of product crystal withdrawl will usually suffice to maintain equilibrium conditions. Third, the process produces a product of high purity containing a minimum of 99.0% $Na_2S_2O_5$ with minimum sulfur dioxide content of 66.70 (theoretical maximum is 67.37) and containing not more than 0.5% sodium sulfite. The product meets stringent specifications for sodium metabisulfite to be used for photographic purposes. Fourth, the invention process avoids formation of excessive amounts of sulfite crystals, thereby avoiding clogging of lines, encrustation of equipment and erosion of pumps and valves. Lastly, suflur dioxide emissions to the atmosphere are controlled at levels below at least about 200 ppm $SO_2$ by volume, without use of specific tail gas scrubbers.

The following Example sets forth the best mode presently contemplated for practice of the invention.

EXAMPLE

With reference to the drawing, equipment employed involves first absorber 2 and second absorber 4, of 12,000 and 8000 gallon liquor capacity respectively. First absorber 2 contains a slurry of sodium metabisulfite crystals in concentrated sodium bisulfite solution having acidity determined on a representative 10 ml. sample of the clear liquor corresponding to about 2 to 3 ml. of N/l $H_2SO_4$ to bring the 10 ml. sample to neutral to methyl orange. Reaction medium in first absorber 2 is maintained at temperature of about 120° to 130° F. Second absorber 2 contains an alkaline aqueous slurry of sodium carbonate in solution containing both sodium sulfite and sodium carbonate at 125° to 140° F having alkalinity corresponding to about 120 to 130 ml titration with N/l $H_2SO_4$ of a 10 ml. sample of the reaction medium slurry to the methyl orange endpoint. The crystals in the first and second absorber are maintained in suspension by means of efficient agitation. Dense soda ash is introduced into the second absorber at a rate of about 1,016 lbs. per hour. Sulfur dioxide-containing gas, obtained by combustion of sulfur in air followed by removal of gaseous elemental sulfur and washing to remove impurities, containing about 20% by volume of sulfur dioxide, is introduced into first absorber 2 at a rate of about 1,716 cu.ff./min. determined at 100° F. at 100% relative humidity and at pressure of about 862 mm.Hg., corresponding to introduction of about 1,211 lbs/hr. of sulfur dioxide, 2,188 lbs/hr. of nitrogen and about 146 lbs/hr. of water. Reaction medium from the first absorber is continuously withdrawn through wringer feed line 9, introduced into wringer 10 wherein sodium metabisulfite crystals are separated from the reaction medium and recovered at a rate of about 1,672 lbs./hr., and mother liquor effluent from wringer 10 is returned to first absorber 2 via wringer effluent return line 11. Tail gas from second absorber 4 is exhausted to the atmosphere through tail gas stack 5. The tail gas contains less than about 50 ppm of sulfur dioxide by volume. The sodium metabisulfite product after washing in the wringer contains more than the 99% by weight of $Na_2S_2O_5$, more than about 66.7% by weight of $SO_2$, not more than 0.5% by weight of sodium sulfite, and not more than 0.05% by weight of sodium thiosulfate. A 5% solution of the sodium metabisulfite product has a pH of about 4.0 to 4.6.

Since various changes may be made in carrying out the process of my invention without departing from its scope and essential characteristics, all matter contained in the above description shall be interpreted as illustrative only and not in a limiting sense, the scope of my invention being defined by the appended claims.

I claim:

1. In the process for making sodium metabisulfite by introducing sulfur dioxide and sodium carbonate into aqueous reaction media to form sodium metabisulfite crystals therein, and recovering the sodium metabisulfite crystals, the improvement which comprises:

a. establishing a first aqueous reaction medium and a second aqueous reaction medium, said first aqueous reaction medium comprising a suspension of sodium metabisulfite crystals in an acidic aqueous solution substantially saturated in sodium metabisulfite having acidity within the range at which a representative 10 ml. sample of the clear solution requires from 1 to 6 ml.N/l $H_2SO_4$ to bring such 10 ml. sample to neutral to methyl orange, and said second aqueous reaction medium comprising an alkaline aqueous suspension of sodium carbonate in a solution containing both sodium sulfite and sodium carbonate having alkalinity not less than that at which a representative 10 ml. sample of the suspension requires not less than 90 ml. of N/l $H_2SO_4$ to bring such 10 ml. sample to neutral to methyl orange;

b. contiuously introducing a sulfur-dioxide-containing gas stream into said first aqueous reaction medium to effect absorption of sulfur dioxide in said first aqueous reaction medium and precipitation of sodium metabisulfite crystals therefrom, while maintaining the temperature of the first reaction medium within the range of from about 80° to 160° F. and introducing the sulfur dioxide-containing gas which remains unabsorbed in said first aqueous reaction medium into said second aqueous reaction medium to effect absorption of substantially all of the remaining sulfur dioxide therein and reaction with sodium carbonate to form sodium sulfite while maintaining the temperature of the second reaction medium above at least about 125° F.;

c. continuously introducing sodium carbonate into said second aqueous reaction medium at a rate sufficient to maintain its alkalinity within the above-stated range;

d. continuously transferring alkaline aqueous suspension of sodium carbonate in solution containing both sodium sulfite and sodium carbonate from said second aqueous reaction medium to said first aqueous reaction medium at a rate sufficient to maintain the acidity of said first aqueous reaction medium within the above-stated range, and overflowing substantially clear solution saturated in sodium metabisulfite from said first aqueous reaction medium to said second aqueous reaction medium to maintain substantially constant liquid level in said first reaction medium; and e. withdrawing solution of sodium metabisulfite containing suspended sodium metabisulfite crystals from said first aqueous reaction medium, separating sodium metabisulfite crystals therefrom, and returning the solution freed from crystals to said first aqueous reaction medium.

2. The improvement of claim 1 wherein the temperature in the first aqueous reaction medium is maintained within the range of from 110° to 140° F., and wherein the temperature in the second aqueous reaction medium is maintained above at least about 125° F. but below about 180° F.

3. The improvement of claim 1 wherein the first aqueous reaction medium has acidity within the range at which a representative 10 ml. sample of the clear solution requires from about 2 to about 4 ml. N/l $H_2SO_4$ to bring such 10 ml. sample to neutral to methyl orange, and wherein the second aqueous reaction medium has alkalinity within the range at which a representative 10 ml. sample of the suspension requires from about 100 to about 140 ml. N/l $H_2SO_4$ to bring such 10 ml. sample to neutral to methyl orange.

4. The improvement of claim 3 wherein the temperature in the first aqueous reaction medium is maintained within the range of from about 110° to about 140° F., and wherein the temperature of the second aqueous reaction medium is maintained above at least about 125° F. but below about 180° F.

5. The improvement of claim 3 wherein the temperature of the first aqueous reaction medium is maintained between about 120° and about 130° F., and wherein the temperature of the second reaction medium is maintained between about 125° and about 140° F.

6. The improvement of claim 1 wherein the first aqueous reaction medium has acidity within the range at which a representative 10 ml. sample of the clear solution requires from about 2 to about 3 ml. N/l $H_2SO_4$ to bring such 10 ml. sample to neutral to methyl orange, and wherein the second aqueous reaction medium has alkalinity within the range at which a representative 10 ml. sample of the suspension requires between about 110 and about 130 ml. N/l $H_2SO_4$ to bring such 10 ml. sample to neutral to methyl orange.

7. The improvement of claim 6 wherein the temperature of the first reaction medium is maintained within the range of from about 120° to about 130° F., and wherein the temperature of the second reaction medium is maintained within the range of from about 125° to about 140° F.

* * * * *